(12) United States Patent
Albrecht

(10) Patent No.: US 7,900,369 B2
(45) Date of Patent: Mar. 8, 2011

(54) ELECTRONIC MEASURING TAPE AND A LENGTH MEASURING DEVICE PROVIDED THEREWITH

(75) Inventor: Josef Albrecht, Legau (DE)

(73) Assignee: Hoechstmass Balzer GmbH (DE)

( * ) Notice: Subject to any disclaimer, the term of this patent is extended or adjusted under 35 U.S.C. 154(b) by 197 days.

(21) Appl. No.: 11/996,789

(22) PCT Filed: Jul. 24, 2006

(86) PCT No.: PCT/EP2006/007279
§ 371 (c)(1),
(2), (4) Date: Jul. 10, 2008

(87) PCT Pub. No.: WO2007/012446
PCT Pub. Date: Feb. 1, 2007

(65) Prior Publication Data
US 2008/0276477 A1 Nov. 13, 2008

(30) Foreign Application Priority Data

Jul. 25, 2005 (DE) .................... 20 2005 011 814 U

(51) Int. Cl.
*G01B 3/00* (2006.01)
(52) U.S. Cl. ............................................. 33/762; 33/763
(58) Field of Classification Search ............. 33/761–763
See application file for complete search history.

(56) References Cited

U.S. PATENT DOCUMENTS

| 3,402,298 | A | * | 9/1968 | Janeway | 250/203.1 |
| 3,862,761 | A | * | 1/1975 | Conley | 369/69 |
| 4,123,753 | A | * | 10/1978 | Gravert | 340/621 |
| 4,161,781 | A | * | 7/1979 | Hildebrandt et al. | 702/164 |

(Continued)

FOREIGN PATENT DOCUMENTS

EP  0740126 A1  10/1996

(Continued)

*Primary Examiner* — G. Bradley Bennett
*Assistant Examiner* — Tania C Courson
(74) *Attorney, Agent, or Firm* — Knobbe Martens Olson & Bear LLP

(57) ABSTRACT

The invention relates to the simple and low-cost production of an electronic measuring tape (10) comprising an external housing (12) provided with a tape exit opening (14), a tape winding-up device (20), a tape (30) which is wound up in the tape winding-up device (20) and is withdrawable from the external housing (12) through the tape exit opening (14), wherein said tape is provided with first and second surfaces. A radiation source (50) is arranged between the tape exit opening (14) and the tape winding-up device (20) for sending a beam to the first surface of the tape (30). A detecting device (60) is placed at the side of the second surface of the tape (30) for receiving the beam and transmitting data representing the received radiation to an evaluation device (70) for determining, from these data, the length of the tape (30) extracted through the tape exit opening (14). According to said invention, the tape (30) is radiation-permeable and provided with a biunique code (40) on one of the two surfaces thereof. Said code represents the length of the tape (30) extracted through the tape exit opening (14) and consists of elements influencing the radiation-transmitting capacity of the tape (30).

Figure 1:
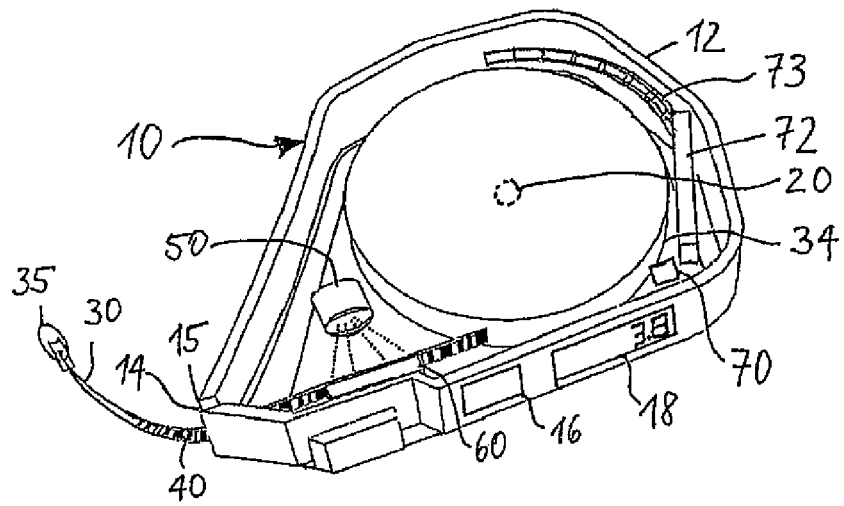

Said invention also relates to an electronic length-measuring device provided with display and evaluation means for determining a length according to received data and for generating visual data according to said length on the display means, wherein said measuring tape (10) is connected to the evaluation unit.

11 Claims, 1 Drawing Sheet

U.S. PATENT DOCUMENTS

| | | | |
|---|---|---|---|
| 4,164,816 A * | 8/1979 | Bergkvist | 33/762 |
| 4,195,348 A * | 3/1980 | Kakutani | 702/164 |
| 4,570,346 A | 2/1986 | Burkhardt | |
| 4,611,402 A * | 9/1986 | Yamamoto et al. | 33/762 |
| 4,631,519 A | 12/1986 | Johnston | |
| 5,035,064 A * | 7/1991 | Care | 33/760 |
| 5,208,767 A * | 5/1993 | George-Kelso et al. | 377/18 |
| 5,426,863 A * | 6/1995 | Biggel | 33/763 |
| 5,691,923 A * | 11/1997 | Adler et al. | 702/164 |
| 5,983,514 A * | 11/1999 | Lindsey | 33/760 |
| 6,658,755 B2 * | 12/2003 | Arlinsky | 33/760 |
| 7,363,723 B1 * | 4/2008 | Peterson | 33/760 |
| 2005/0034320 A1 | 2/2005 | Connor | |

FOREIGN PATENT DOCUMENTS

EP 1439370 A2 7/2004

* cited by examiner

ELECTRONIC MEASURING TAPE AND A LENGTH MEASURING DEVICE PROVIDED THEREWITH

The invention relates to an electronic measuring tape as well as a length-measuring device provided therewith in accordance with the generic part of claim 1 and claim 10, respectively.

It is getting increasingly more important to electronically collect and evaluate the data obtained by length-measuring procedures. In doing so, it is advantageous not to first take the respective length dimensions in a conventional way with a mechanical measuring tape and then to enter them into a computer, but rather to already acquire the length dimensions to be determined in the form of electronic data and to transfer them to an evaluation unit within a computer. For example, EP 0 740 126 A1 discloses such an electronic measuring tape in accordance with the generic part of claim 1 and such an electronic length-measuring device in accordance with the generic part of claim 10, respectively. A tape that can be wound upon a tape winding-up device comprises equidistant apertures and is moved between a light source and a detector assembly when the tape is withdrawn from its casing such that light pulses are allowed to successively pass the apertures toward the detector assembly, from which an evaluation unit coupled to the detector assembly determines the length of the extracted tape and thus the length dimension to be detected.

On the one hand, such an electronic measuring tape exhibits the disadvantage that, due to the incremental way of detecting the length dimension, the light source and the detector assembly must be powered during the entire operation of extracting the tape and thus are very energy-consuming which is very disadvantageous, in particular in the case of a battery-operated device. Moreover, a wrong measuring result is produced, if an error occurs during extraction of the tape, also including, for example, extracting the tape too rapidly. Also, the limitation of the speed of withdrawing the tape from the casing represents a big drawback of this electronic measuring tape.

The present invention is based on the problem to provide an electronic measuring tape and an electronic length-measuring device provided therewith, which will overcome the aforesaid problems and can nevertheless be manufactured in a simple and thus economical way. In particular, such an electronic measuring tape and such an electronic length-measuring device, respectively, shall allow for quickly extracting the tape, without falsifying or even rendering impossible the measurement, and each measuring operation should be feasible with minimum energy consumption.

This problem is solved by an electronic measuring tape according to claim 1 and an electronic length-measuring device according to claim 10, respectively. Advantageous developments of the invention are the subject-matter of the dependent claims.

According to the invention, the material making up the tape is provided to be radiation-permeable, so that there is no need for providing an opening in the tape. In order to obtain a signal usable for measurement in the detector assembly, a biunique code is provided on one of the two surfaces of the tape, which code represents the length of the tape extracted through the tape exit opening at any point of the tape in a unique way, for which purpose the code of course requires a tape length corresponding to the length of the detector assembly. Besides, the code consists of elements which influence the radiation transparency of the tape. So, for example, dark bars can be used as such elements, which block the radiation completely or shield it at least to a large extent. Due to the biunique code, it is sufficient to shortly activate the radiation source and the detector assembly after a respective extraction of the tape, whereupon the radiation source emits a short flash and infrared light flash, respectively, which is projected accordingly on the detector assembly by the different transmission of the elements of the code and thus indicates the length of the extracted tape. In this way, the linear measurement can be performed in an extremely energy-saving way. In addition, the stability of the tape is increased in the light of the prior art, since there is no need to perforate the tape.

Preferably, the tape is made of a fabric, in particular from plastic, whereby it can be developed particularly flexible. A particularly easy exchangeability of the tape can be achieved by arranging it, together with its tape winding-up device, in a tape cage of its own that can be removed from the external housing, if required—for example for the purposes of maintenance, replacement due to wear, or for other reasons.

The code can be applied onto the tape in a particularly simple way by a printing process such as screen printing. However, the code can also be applied onto the tape by an etching technique, for example. The code used is preferably a Gray code, a PRBS code (pseudo random binary sequence code), a PRBS code modified in an appropriate way, or a bar code having a maximized number of transitions between, for example, dark bars and blank areas, in order to optimize resolution and improve measurement reliability.

Handling the electronic measuring tape according to the invention and managing the energy consumption thereof can be optimized by providing a release mechanism—for example in the form of a pressure key—on the outside of the external housing to activate the radiation source which is switched on by the release mechanism for a very short time. In doing so, it is advantageous to provide an auxiliary means for switching off the radiation source again at the earliest. It goes without saying that a successful measuring must also involve activation of the detector assembly.

It is preferred to provide a vibrating device—comparable to a vibration alarm of a mobile phone—in the external housing for the electronic measuring tape, which vibrating device can be activated by the evaluation device, for example in the case of an incorrect measuring. This is very advantageous for a troublefree handling of the electronic measuring tape according to the invention in relation to an appropriate message on a display device or an alarm by means of an acoustic device, in particular in work situations with insufficient lighting conditions and high noise level, respectively.

The operation can be facilitated, if a display means is provided on the outside of the external housing of the electronic measuring tape, which display means can indicate information such as the length measured last or other information desirable for the measuring.

If the electronic measuring tape shall be able to be operated as a self-contained device, an evaluation device must be provided within the external housing of the electronic measuring tape.

Figure 2:
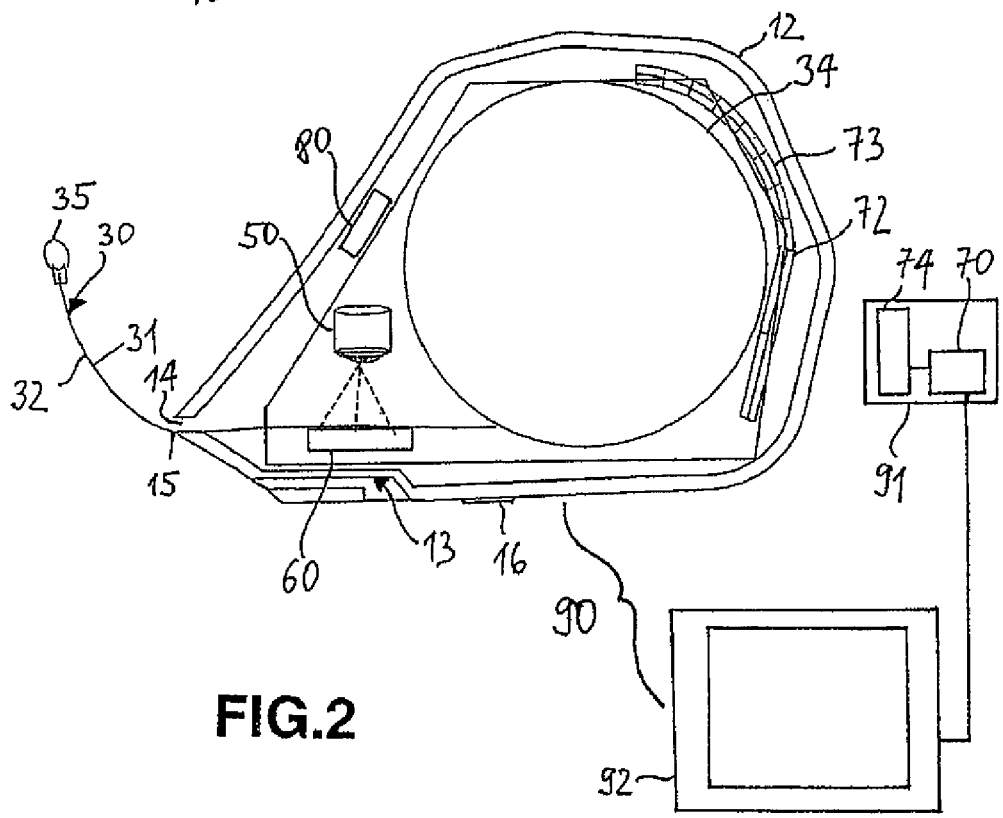
Figure 3:
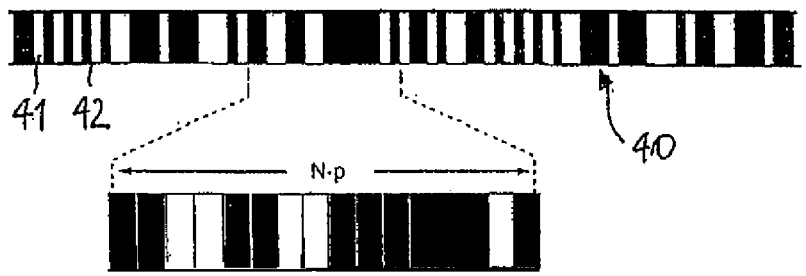

Moreover, it is provided according to the invention to design the electronic measuring tape as a part of an electronic length-measuring device—in particular in the form of a computer system. Here, the computer system includes a display means in the form of a monitor and an evaluation device in the form of a processor, wherein the processor is connected to an electronic measuring tape in accordance with any of the claims 1 to 8. Thus, measurements with the electronic measuring tape can be made in a comfortable way, which measurements are automatically forwarded to the evaluation device and adopted by the computer system for further processing. A particularly comfortable handling results from connecting the electronic measuring tape and the evaluation device in a wireless way by a transmitter included in the electronic measuring tape and a receiver included in the computer system. Appropriate wireless connections of this type include, for example, infrared or Bluetooth interfaces. Further advantages, features, and characteristics of the invention will become apparent from the following description of preferred but not limiting embodiments of the invention on the basis of the schematic drawing which is not true to scale and wherein:

FIG. 1 is a perspective plan view of a preferred embodiment of an electronic measuring tape according to the invention, having an opened external housing, FIG. 2 is a schematic illustration of a preferred embodiment of an electronic length-measuring device according to the invention, having the electronic measuring tape illustrated in plan view and with opened external housing, and FIG. 3 is an illustration of a PRBS code, as it can be used in an advantageous manner for the electronic measuring tape according to the invention.

In accordance with FIGS. 1 and 2, the electronic measuring tape 10 is enclosed by an external housing 12 for a good handling by an operator and as a protection against environmental influences. In a tape cage 34, there is arranged a tape 30 which can be wound on or off a tape winding-up device 20 in a manner known per se, wherein only the take-up mandrel is shown for the sake of simplicity. The tape 30 is preferably made of a fabric, in particular from plastic, and is thus highly flexible and applicable in practically each measuring situation. The free end of the tape 30 has fastened thereto a tape grip 35 allowing the tape 30 to be withdrawn from the external housing 12 through a tape exit opening 14. A reference edge 15 on the outside of the tape exit opening 14 serves as a reference for the linear measurement. The tape cage 34 and the tape 30 form a structural unit of their own, that can readily be removed from and reinserted into the external housing 12 and can be replaced by a new structural unit, respectively, if required, as for example for maintenance or after wear.

A radiation source 50, for example in the form of an infrared light source, is arranged within the external housing 12 to irradiate a detector assembly 60. In this case, the tape 30 is directed in a way such as to extend between the radiation source 50 and the detector assembly 60. The tape 30 exhibits a PRBS code (pseudo random binary sequence code) on one of the two surfaces thereof (here surface 32), which code is designed such that each section is present only once on the whole tape 30 of a length corresponding to the length of the detector assembly 60, thus allowing a unique correlation with the length of the tape 30 extracted through the tape exit opening 14. An example of such a PRBS code is illustrated in FIG. 3 and will be addressed later. The other surface 31 of the tape 30 can, for example, be equipped with a conventional centimeter and millimeter calibration, in order to enable an operator to perform a "manual" reading and thus to allow for the potential of a plausibility check of the measurement made. With the tape 30 withdrawn from the external housing 12, a measurement can be accomplished by pressing a release key 16 attached at the external housing 12. In doing so, the radiation source 50 is temporarily activated and radiates light onto the tape 30. The light is absorbed by the dark bars 42 (cf. FIG. 3), while the light passes through the tape 30 at the bright areas 41 and impinges on the detector assembly 60. The code pattern projected by the transillumination of tape 30 on detector assembly 60 by the casting of shadows is transmitted to an evaluation device 70, where that pattern is compared with the code sections stored therein. From the comparison of the patterns and the data records, respectively, the evaluation device determines the length of the tape 30 pulled ahead reference edge 15. This length can be indicated on a display means 18 provided at the external housing 12 in order to communicate the determined length to the operator. In this embodiment, the electronic measuring tape thus represents an independently usable length-measuring device. According to a further embodiment, a transmission means 72 including a transmitting antenna 73 may additionally be provided, which transmits in a wireless manner the determined linear measure to a computer for further processing and storage, if required. The tape grip 35 can be stowed away in a tape storage recess 13 to keep the tape 30 safe and fixed, for example when carrying out a circumferential measurement.

In accordance with FIG. 2, the electronic measuring tape according to the invention may also be part of an electronic length-measuring device 90, wherein evaluation of the length-measuring data will no longer take place in the electronic measuring tape 10 itself, but the evaluation device 70 will be arranged in an external unit 91 such as a computer system. For this purpose, the data acquired by the detector assembly 60 are forwarded in a wireless manner to an assigned receiver means 74 in the external unit 91 via the transmission means 72 and the transmitting antenna 73—for example by means of an infrared or Bluetooth interface—whereupon they are evaluated by the evaluation device 70 and the determined length dimension is displayed on a display means 92 such as a computer monitor. This embodiment does not necessarily require a display means 18 at the external housing 12 to show the determined length dimension, however, such a display means may likewise be provided to increase ease of use. In connection with the external unit 91 and the display means 92, additional input means can be provided, such as a keyboard, a mouse, and the like, which is not illustrated, however. In all other respects, the design of the electronic measuring tape provided for this application is substantially equal to the embodiment described with reference to FIG. 1.

For operation, it is particularly advantageous to provide a vibrating device 80 in the external housing 12, as is frequently used with mobile phones, for example, in order to be able to give a tactile feedback to the operator, if the evaluation unit 70 wants to inform the operator of a measuring error, a failure of the system or a request to review the measuring result. In addition, such a tactile feedback can also be used as a confirmation for a successful measuring. Here, the transmission of the appropriate signal from the evaluation unit 70 to the vibrating device 80 takes place using the transmission means 72 and the receiver means 74, which will both have to be designed in a bi-directional manner as respective transceiver means, or by means of transmission means not particularly illustrated.

FIG. 3 shows an example of a PRBS code 40 comprising dark bars 42 impermeable for the light and bright bars 41. For clarification, a section of N·p marks is represented in an enlarged scale, where N represents the number of detector elements in the detector assembly 60 and p represents the widths of the respective detector elements. As there are $2^N$ different combinations of the lengths of N bits, the tape provided with the PRBS code can thus have a maximum length of $L=2^N \cdot p$. For the purposes of this invention, N is typically within a range of 16 to 32, and the widths of the marks of code 40 amount to approximately p=1 millimeter. The tape 30 of the present invention is arranged in a distance of approximately 1 mm from the detector assembly 60, while the spacing between the tape 30 and the radiation source 50 is about 12 mm. Thus, a good compromise is obtained between a high luminous efficiency and a luminous intensity distribution which is as uniform as possible, if two punctiformly radiant infrared LEDs are used as the radiation source 50. The described arrangement cannot only be realized very compactly, but also goes without projection optics, which keeps manufacturing costs low. If, for example, N=11 marks are used, each having a line width of p=1 mm, this will result in 2,048 possibilities (corresponding to a PRBS code length of the tape of full two meters) in the case of a sensor length of 11 mm. Since the edge of the sensor is not fully usable due to the implementation of derivatives of the vertical signal radiation of the sensor, a length of the sensor of 12.5 mm is necessary in practice in order to be able to correct the diffusion. As an alternative, it is, however, also possible, for example, to modify and form the code in such a way that it is split up to several sensors, for example two sensors each having a length of 7 mm and a spacing of 3 mm. In this case, shorter and thus considerably more economical sensors can be used then. The example described above allows to achieve a theoretical resolution of 300 dpi and 0.085 mm, respectively, assuming a resolution of 0.2 mm in practice. Here, the fine reading for accuracies below one millimeter can take place by utilizing the phase relation of the code, i.e. by the local resolution of the individual sensor elements.

A printing process allows the code 40 to be applied onto the tape 30 in a particularly simple and economical way, accompanied by a high working reliability. Alternatively or additionally, an etching technique can also be used to establish the code on and in the tape respectively. With these manufacturing methods, a lateral offset in the transverse direction of the tape is noncritical for the accuracy of the measurements to be obtained.

The present invention offers many advantages. So, the radiation source for each measuring must be switched on only for about 10 microseconds; thus, energy consumption is only determined by the number of measurements performed. The arrangement according to the invention does not require any reference point such as a limit switch or a further sensor, which keeps manufacturing costs low. It is of particular importance that the tape can be moved at any desired speed between the measurements; the measuring is not affected thereby since it will only take place with the tape fixed. With known prior art devices comprising integral measuring, which moreover are partly subject to slip, tape speed must be kept low in order to not overcharge the evaluation electronics; in addition, the radiation source must remain switched on during the entire movement of the tape during such an incremental relative measurement, which increases the energy consumption drastically. The printing process for the code, which can easily be accomplished, allows a coarse resolution, which in turn allows an application of the detector assembly in the transillumination procedure without any complex imaging optics. Using the electronic measuring tape according to the invention in an electronic length-measuring device with wireless transmission of the measuring data from the measuring tape to a processing means substantially enhances the ease of use, because the operator is not disturbed by a cable.

It is to be noted that the features of the invention described with reference to individual embodiments, such as the design of the electronic measuring tape or details of the used code, can also be present with other embodiments, unless otherwise noted or forbidden per se for technical reasons.

The invention claimed is:

1. An electric measuring tape comprising an external housing provided with a tape exit opening, comprising:
    a tape winding-up device,
    a tape wound up in the tape winding-up device and withdrawable from the external housing through the tape exit opening, the tape having a first surface and a second surface,
    a radiation source arranged between the tape exit opening and the tape Winding-up device, for sending a beam onto the first surface of the tape, and
    a detector assembly placed at the side of the second surface of the tape, for receiving the beam and outputting data representing the received radiation to an evaluation device for determining the length of the tape extracted through the tape exit opening,
    wherein the tape is radiation-permeable and is provided with a biunique code on one of the two surfaces thereof, the code representing the length of the tape extracted through the tape exit opening and comprising elements which influence the radiation-transmitting capacity of the tape, and wherein the detector assembly is configured to determine the length of the tape extracted without continuous activation of the radiation source.

2. A measuring tape according to claim 1, wherein the tape comprises fabric and/or plastic.

3. A measuring tape according to claim 1, wherein the tape is located in a tape cage which can be removed from the external housing.

4. A measuring tape according to claim 1, wherein the code is imprinted or etched in.

5. A measuring tape according to claim 1, wherein the code is a Gray code, a PRBS code, a modified PRBS code, or a bar code with a maximized number of lightdark transitions.

6. A measuring tape according to claim 1, wherein a release device for activating the radiation source as well as preferably a means for automatically deactivating the radiation source after the activation thereof are provided on the outside of the external housing.

7. A measuring tape according to claim 1, wherein a vibrating device is provided, which can be operating by the evaluation device.

8. A measuring tape according to claim 1, wherein a display means is provided on the outside of the external housing.

9. A measuring tape according to claim 1, wherein the evaluation device is located within the external housing.

10. An electronic lengthmeasuring device comprising:
    a display,
    an evaluation device for determining a length dimension for display, and
    an electronic measuring tape connected to the evaluation device wherein the electronic measuring tape comprises a tape winding-up device,
    a tape wound up in the tape winding-up device and withdrawable from the external housing through the tape exit opening, the tape having a first surface and a second surface,
    a radiation source arranged between the tape exit opening and the tape winding-up device, for sending a beam onto the first surface of the tape, and
    a detector assembly placed at the side of the second surface of the tape, for receiving the beam and outputting data representing the received radiation to the evaluation device for determining the length of the tape extracted through the tape exit opening,
    wherein the tape is radiation-permeable and is provided with a biunique code on one of the two surfaces thereof, the code representing the length of the tape extracted through the tape exit opening and comprising elements which influence the radiationtransmitting capacity of the tape, and wherein the detector assembly is configured to determine the length of the tape extracted without continuous activation of the radiation source.

11. A length-measuring device according to claim 10, wherein the connection between the electronic measuring tape and the evaluation device is provided in a wireless manner.

* * * * *

UNITED STATES PATENT AND TRADEMARK OFFICE
CERTIFICATE OF CORRECTION

| | | |
|---|---|---|
| PATENT NO. | : 7,900,369 B2 | Page 1 of 1 |
| APPLICATION NO. | : 11/996789 | |
| DATED | : March 8, 2011 | |
| INVENTOR(S) | : Josef Albrecht | |

It is certified that error appears in the above-identified patent and that said Letters Patent is hereby corrected as shown below:

In Column 5, Line 64, in Claim 1, change "Winding-up" to --winding-up--.

In Column 6, Line 22, in Claim 5, change "lightdark" to --light-dark--.

In Column 6, Line 34, in Claim 10, change "lengthmeasuring" to --length-measuring--.

In Column 6, Line 56, in Claim 10, change "radiationtransmitting" to --radiation-transmitting--.

Signed and Sealed this
Twentieth Day of September, 2011

David J. Kappos
*Director of the United States Patent and Trademark Office*